UNITED STATES PATENT OFFICE.

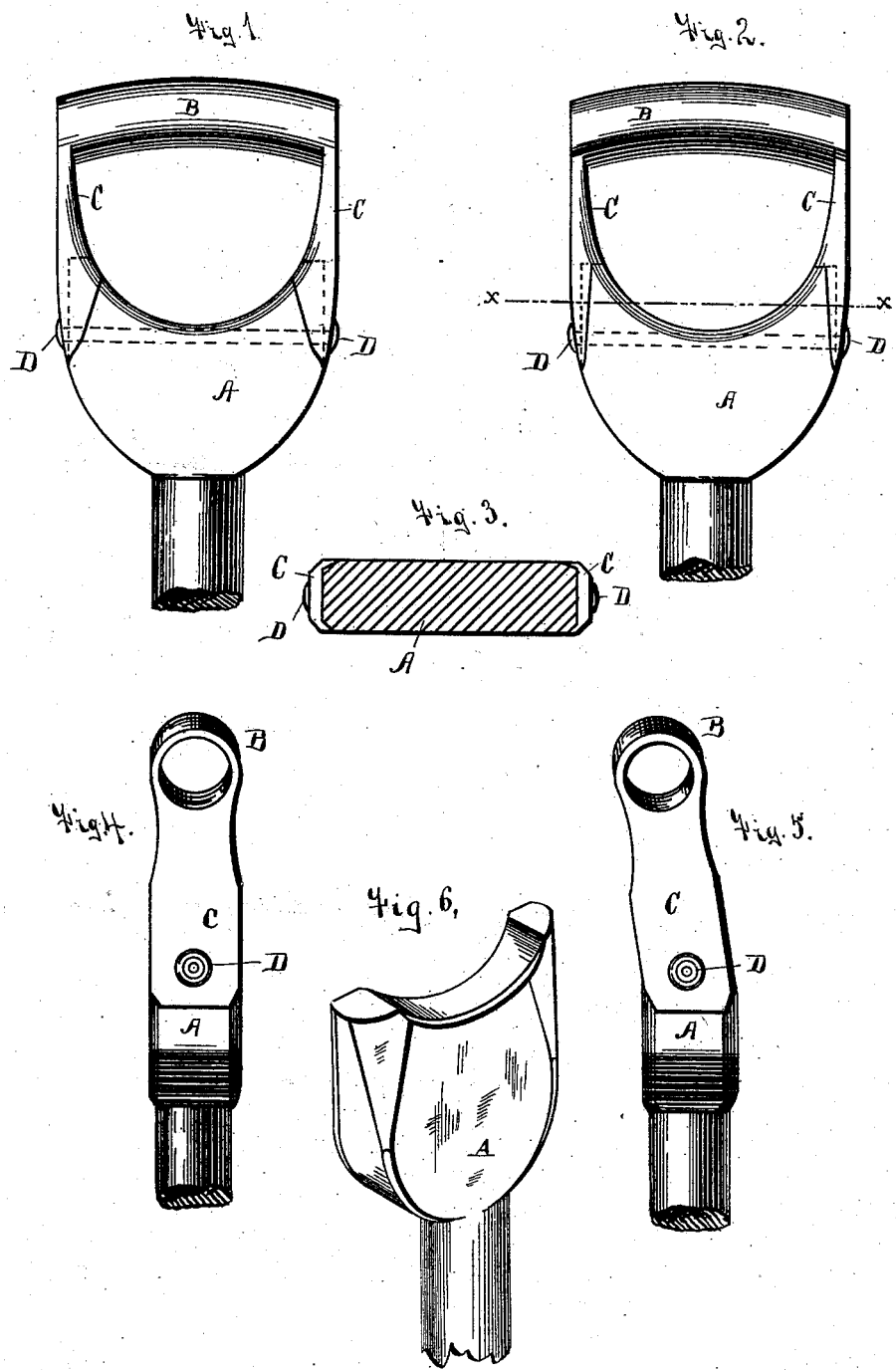

WILLIAM CHISHOLM, OF CLEVELAND, OHIO.

SHOVEL-HANDLE.

SPECIFICATION forming part of Letters Patent No. 227,881, dated May 25, 1880.

Application filed March 15, 1880. (No model.)

*To all whom it may concern:*

Be it known that I, WILLIAM CHISHOLM, of Cleveland, in the county of Cuyahoga and State of Ohio, have invented certain new and useful Improvements in Shovel-Handles; and I do hereby declare the following to be a full, clear, and exact description of the invention, such as will enable others skilled in the art to which it pertains to make and use it, reference being had to the accompanying drawings, which form part of this specification.

My invention relates to shovel-handles; and it consists in a metallic handle adapted to be attached readily to the wide portion, above the neck, of an ordinary shovel-handle, either upon a straight line or at an angle.

The object of my invention is to provide a shovel-handle that can be used without damage to itself, not only as a shovel but also as a tamping-iron.

I have found from experience in the manufacture of shovels that the old-fashioned wooden shovel, in the first place, is expensive; secondly, that quite a large per cent. of those purchased for use are cast aside as worthless before they are ever permanently attached to the blade, for the reason that the grasp-bar becomes season-checked or is split in handling, thereby rendering the whole handle utterly useless. My invention is intended to supply a supplemental grasp-bar for handles of this description. It also will be found useful in repairing shovel-handles whose grasp-bar has become broken or destroyed.

In the drawings, Figure 1 is a front view of a shovel-handle embodying my invention. Fig. 2 is a rear view of the same. Fig. 3 is a sectional view of Fig. 2 on the line *x x*. Fig. 4 is a view, with my improved handle attached, on a line parallel to the wide portion or head-piece of the handle. Fig. 5 is a side view of my improved handle attached at an angle, whereby it is better adapted for use as a tamping-iron. Fig. 6 is a side perspective view of the wooden head-piece, as in Fig. 5, without its metallic handle attached.

In the said drawings, A represents the ordinary widened head-piece of a shovel-handle immediately below the hand-hold and grasp-bar. B represents the grasp-bar, which I prefer making hollow by coring, so as to render it both strong and light. C C represent the side bars inclosing the hand-hold. Upon the inner faces of these side bars are grooves or slots adapted to receive the head-piece A, which latter may be prepared to receive my improved handle at any desired angle. My improved handle is attached to the head-piece A by means of the bolt D passing through the side bars, C, and head A.

I prefer to construct this improved handle of malleable iron, although I do not confine myself to any material. When so constructed the whole, consisting of the grasp-bar B and side bars, C C, is cast in one piece, and preferably with the grasp-bar B hollow.

For ordinary uses this handle could be attached and perform the functions of the ordinary wooden handle, as shown in Fig. 4; but where it is desired for use in the construction of railroads, and where a tamping-tool is required, I would prefer to attach the handle to the head of the shovel at an angle, as shown in Fig. 5, as by this means it could be more readily inserted beneath the ties, the object of my invention being to furnish a handle that can be made cheaply and at the same time durable, and one that can be readily attached to the ordinary handle.

To fit the wooden head-piece to the metallic side bars both faces of the head-piece are dressed away at points adjacent to the edges of the head-piece, said dressed portions fitting within the longitudinal grooves of the side bars, so that the latter may be flush with the faces of the head-piece. When it is desired to secure the metallic attachment to the wooden head-piece in lateral inclination, one face of the head-piece has its edge portions dressed away to a greater extent than the other face. The grooved side bars are adapted to fit over the edges of the head-piece, so as to cause the metallic attachment to be at the desired angular inclination.

I am aware that shovel-handles constructed of metal have already been made; but the difficulty has been that the head-piece also was made of metal, and the handle at its neck attached by means of an eye. This has tended to very much weaken the handle, and it has been exceedingly liable to break at the point where the eye terminates; and also in using handles of this description, or in attaching them to the ordinary shovel-handle, it has become necessary to very much shorten the length of the handle, thereby rendering them undesirable.

What I claim is—

1. In a shovel, the combination, with a handle having a wooden head-piece formed without grasp-bar or side bars, of a metallic attachment consisting of a grasp-bar and side bars, the latter being formed with longitudinal grooves in which the edges of the head-piece fit, and a fastening device which secures the side bars to the head-piece, substantially as set forth.

2. In a shovel, the combination, with a handle whose wooden head-piece, formed without grasp-bar or side bars, has the edge portions of one face dressed away to a greater degree than the opposite face, of a metallic attachment consisting of a grasp-bar and side bars, which latter have grooves in which the edges of the head-piece fit, said attachment being thereby secured in lateral inclination to the head-piece, substantially as set forth.

In testimony whereof I have signed my name to this specification in the presence of two subscribing witnesses.

WILLIAM CHISHOLM.

Witnesses:
JNO. CROWELL, Jr.,
WILLARD FRACKER.